(12) United States Patent
Guo et al.

(10) Patent No.: US 11,921,410 B2
(45) Date of Patent: Mar. 5, 2024

(54) LIGHT SOURCE SYSTEM AND DISPLAY APPARATUS

(71) Applicant: APPOTRONICS CORPORATION LIMITED, Guangdong (CN)

(72) Inventors: Zuqiang Guo, Shenzhen (CN); Bingke Yang, Shenzhen (CN); Yi Li, Shenzhen (CN)

(73) Assignee: APPOTRONICS CORPORATION LIMITED, Guangdong (CN)

( * ) Notice: Subject to any disclaimer, the term of this patent is extended or adjusted under 35 U.S.C. 154(b) by 156 days.

(21) Appl. No.: 17/621,395

(22) PCT Filed: Jun. 24, 2020

(86) PCT No.: PCT/CN2020/098206
§ 371 (c)(1),
(2) Date: Dec. 21, 2021

(87) PCT Pub. No.: WO2020/259615
PCT Pub. Date: Dec. 30, 2020

(65) Prior Publication Data
US 2022/0334457 A1    Oct. 20, 2022

(30) Foreign Application Priority Data
Jun. 28, 2019 (CN) .......................... 201910579747.X

(51) Int. Cl.
*G02B 26/00* (2006.01)
*G03B 21/20* (2006.01)

(52) U.S. Cl.
CPC ......... *G03B 21/204* (2013.01); *G02B 26/008* (2013.01); *G03B 21/2013* (2013.01); *G03B 21/208* (2013.01)

(58) Field of Classification Search
CPC ................ G03B 21/204; G03B 21/208; G03B 21/2073; G03B 21/2013; G02B 26/008
See application file for complete search history.

(56) References Cited

U.S. PATENT DOCUMENTS

2018/0252993 A1*   9/2018   Akiyama ............. G03B 21/204

FOREIGN PATENT DOCUMENTS

| CN | 102402111 | 4/2012 |
|---|---|---|
| CN | 102518964 | 6/2012 |

(Continued)

OTHER PUBLICATIONS

SEARCH English translation of CN 102707553 A (Year: 2012).*

(Continued)

*Primary Examiner* — Omar Rojas Cadima
(74) *Attorney, Agent, or Firm* — Burris Law, PLLC

(57) ABSTRACT

A light source system and a display apparatus are provided. The light source system includes first and second light emitting assemblies, a wavelength conversion device, an optical assembly, and a light combining device. The first light emitting assembly generates at least one primary color light. The second light emitting assembly generates excitation light. The wavelength conversion device is at least partially disposed on the optical path of the excitation light, and used for receiving the excitation light and generating corresponding excited light. The optical assembly is disposed on the optical path of the excited light, and used for increasing the amount of optical expansion of the excited light. The light combining device is disposed on the common optical path of the primary color light and the excited light and located behind the optical assembly, and used for combining the primary color light and the excited light.

20 Claims, 6 Drawing Sheets

(56) References Cited

FOREIGN PATENT DOCUMENTS

| CN | 102566230 | | 7/2012 | |
|----|-----------|---|--------|---|
| CN | 102707553 | | 10/2012 | |
| CN | 102707553 A | * | 10/2012 | ......... G02B 27/0927 |
| CN | 203217230 | | 9/2013 | |
| CN | 104656355 | | 5/2015 | |
| CN | 204422793 | | 6/2015 | |
| CN | 204595411 U | * | 8/2015 | |
| CN | 104991407 | | 10/2015 | |
| CN | 107688274 | | 2/2018 | |
| CN | 107703705 | | 2/2018 | |
| CN | 108535943 | | 9/2018 | |
| CN | 109557753 | | 4/2019 | |
| CN | 109870871 | | 6/2019 | |
| JP | 2013033226 A | * | 2/2013 | ......... G02B 27/1046 |
| JP | 2013076870 | | 4/2013 | |
| JP | 2017122838 A | * | 7/2017 | ........... G02B 26/008 |
| WO | 2014024218 | | 2/2014 | |
| WO | 2018166038 | | 9/2018 | |

OTHER PUBLICATIONS

SEARCH English translation of JP-2013033226-A (Year: 2013).*
SEARCH English translation of JP 2017122838 A (Year: 2017).*
SEARCH English translation of CN 204595411 U (Year: 2015).*
International Search Report for corresponding International Application PCT/CN2020/098206, dated Sep. 16, 2020.
Office Action issued in corresponding CN Application 201910579747. X, dated Nov. 2, 2022, and an English Translation, 12 pages.

* cited by examiner

LIGHT SOURCE SYSTEM AND DISPLAY APPARATUS

CROSS-REFERENCE TO RELATED APPLICATIONS

This application is a National Phase Application of International Application No. PCT/CN2020/098206, filed on Jun. 24, 2020, which claims priority to and the benefit of CN 201910579747.X, filed on Jun. 28, 2019. The disclosures of the above applications are incorporated herein by reference.

FIELD

The present disclosure relates to the field of optical technologies, and particularly, to a light source system and a display apparatus.

BACKGROUND

The statements in this section merely provide background information related to the present disclosure and may not constitute prior art.

In recent years, projection display apparatus develop towards high brightness, wide color gamut, and small size. A multi-color laser display solution can achieve an excellent display effect, and has developed rapidly in recent years. In the related art, the multi-color laser display solution can be mainly classified into two categories: one is an RGB three-color pure laser display optical-mechanical system, and the other is a three-color pure laser display system mixed with fluorescence.

SUMMARY

This section provides a general summary of the disclosure and is not a comprehensive disclosure of its full scope or all of its features.

A main problem solved by the present disclosure is how to reduce light loss of the excited light when the primary light and the excited light are combined.

In order to solve the above technical problems, the technical solution adopted in the present disclosure is to provide a light source system. The light source system includes a first light-emitting assembly, a second light-emitting assembly, a wavelength conversion device, an optical assembly, and a light combination device. The first light-emitting assembly is configured to generate at least one primary light. The second light-emitting assembly is configured to generate excitation light. The wavelength conversion device is at least partially provided on an optical path of the excitation light and configured to receive the excitation light and generate an excited light. The optical assembly is provided on an optical path of the excited light and configured to increase etendue of the excited light. The light combination device is provided on a common optical path of the at least one primary light and the excited light, located behind the optical assembly, and configured to combine the at least one primary light and the excited light.

In order to solve the above technical problem, another technical solution adopted in the present disclosure is to provide a display apparatus. The display apparatus includes the above light source system.

Through the above solutions, beneficial effects of the present disclosure are as follows. The light source system in the present disclosure includes the first light-emitting assembly, the second light-emitting assembly, the wavelength conversion device, the optical assembly, and the light combination device, the first light-emitting assembly and the second light-emitting assembly are configured to generate at least one primary light beams and excitation light, respectively, the second light-emitting assembly can lead the excitation light to enter the wavelength conversion device, so that the wavelength conversion device generates the excited light and outputs the excited light to the optical assembly. The optical assembly process processes the incident excited light and outputs the excited light with increased etendue to the light combination device which combines the primary light and the excited light. Since the excited light and the primary light are combined in the optical path after the etendue of the excited light is increased, a ratio of the etendue of the excited light to the etendue of the primary light is increased, so that loss of the excited light can be effectively reduced when light combination is performed, thereby improving optical efficiency of the light source system.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

In order to more clearly illustrate technical solutions of embodiments of the present disclosure, the accompanying drawings used in the embodiments are briefly described below. Obviously, the drawings described below are merely a part of the embodiments of the present disclosure. Based on these drawings, those skilled in the art can obtain other drawings without any creative effort.

Figure 1:
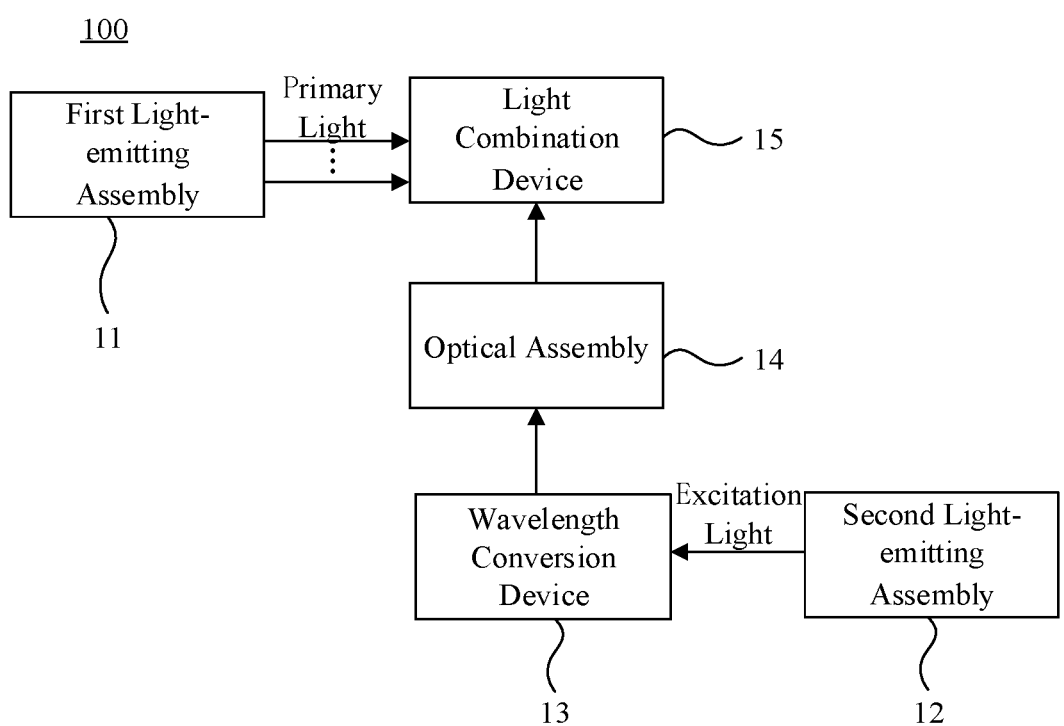
FIG. 1 is a schematic diagram of a light source system according to a first embodiment of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Technical solutions in embodiments of the present disclosure will be clearly and completely described below in conjunction with drawings of the present disclosure. Obviously, the embodiments described are only a part of embodiments of the present disclosure, rather than all embodiments. Based on the embodiments in the present disclosure, all other embodiments obtained by those skilled in the art without creative efforts shall fall within the protection scope of the present disclosure. In the related art, the RGB three-color pure laser display system has bright colors and wide color gamut. However, due to excellent coherence of laser itself, speckles of its image is serious, so that various complicated methods are required to reduce the speckles. Meanwhile, cost of the laser is also very high. The multi-color laser and fluorescent hybrid optical-mechanical system can not only achieve high overall brightness and wide color gamut by using characteristics of high brightness and good color of the laser, but also improve the serious problem of speckles caused by pure laser display by using low-cost mixing of fluorescence and laser, thereby reducing cost of an entire system and improving display effect of an image. In existing laser fluorescent light sources, three primary colors RGB are formed mostly by using blue laser and fluorescent excited by blue laser. Due to a large spectrum difference between laser and fluorescence, laser can be easily combined with fluorescence by a dichroic sheet. However, regarding a multi-color laser light source, a laser spectrum and a fluorescence spectrum can have an overlapping portion, resulting in a certain loss of fluorescence by combining laser with fluorescence. The more laser is added, the more loss of fluorescence will be.

FIG. 1 is a schematic diagram of a light source system according to a first embodiment of the present disclosure. Referring to FIG. 1, the light source system 100 includes a first light-emitting assembly 11, a second light-emitting assembly 12, a wavelength conversion device 13, an optical assembly 14, and a light combination device 15.

The first light-emitting assembly 11 can include at least one primary light emitting component, such as a laser component or a light-emitting diode. The primary light emitting component is configured to generate at least one primary light. The first light-emitting assembly 11 can lead the generated primary light to the light combination device 15 through an emission optical path of the primary light. Correspondingly, taking the laser component as an example, the primary light can include lasers with various colors, e.g., a red laser, a green laser, and/or a blue laser.

The second light-emitting assembly 12 is configured to generate excitation light, and includes at least one excitation light source for generating excitation light. The wavelength conversion device 13 is at least partially provided on a light path of the excitation light. The wavelength conversion device 13 is configured to receive the excitation light, generate an excited light correspondingly, and emit the generated excited light to the optical assembly 14.

In an embodiment, the second light-emitting assembly 12 can include a blue laser component. The blue laser component emits a blue laser as excitation light and then enters the wavelength conversion region of the wavelength conversion device 13. The wavelength conversion region contains wavelength conversion materials capable of converting wavelength. The wavelength conversion material receives the blue laser and emits the excited light having a wavelength different from the blue laser to the optical assembly 14. The wavelength conversion material can be a quantum dot or a fluorescent material, etc. The fluorescent material is taken as an example in this embodiment. Fluorescent materials with different colors can emit fluorescence with corresponding colors under excitation of the excitation light. The fluorescent material in this embodiment can include a yellow fluorescent material, a red fluorescent material, or a green fluorescent material.

The optical assembly 14 is provided on the emission light path of the excited light, and is configured to process the incident excited light so as to increase etendue of the excited light. The light combination device 15 is provided on a common emission light path of the primary light and the excited light and behind the optical assembly 14. The light combination device 15 is configured to combine the excited light emitted from the optical assembly 14 and the primary light emitted from the first light-emitting assembly 11, and emit the combined light.

Distinguishing from the related art, the embodiments provide the light source system 100. The light source system 100 includes the first light-emitting assembly 11, the second light-emitting assembly 12, the wavelength conversion device 13, the optical assembly 14, and the light combination device 15; before combining a laser beam and the excited light, the excited light generated by the wavelength conversion device 13 is processed by the optical assembly 14, which increases the etendue of the excited light. Since the laser beam of the primary light is combined with the excited light on the optical path after the etendue of the excited light is increased, a ratio of etendue of the excited light to etendue of the laser beam is increased, so that loss of the excited light can be effectively reduced during light combination, thereby improving optical efficiency of the light source system 100.

Figure 2:
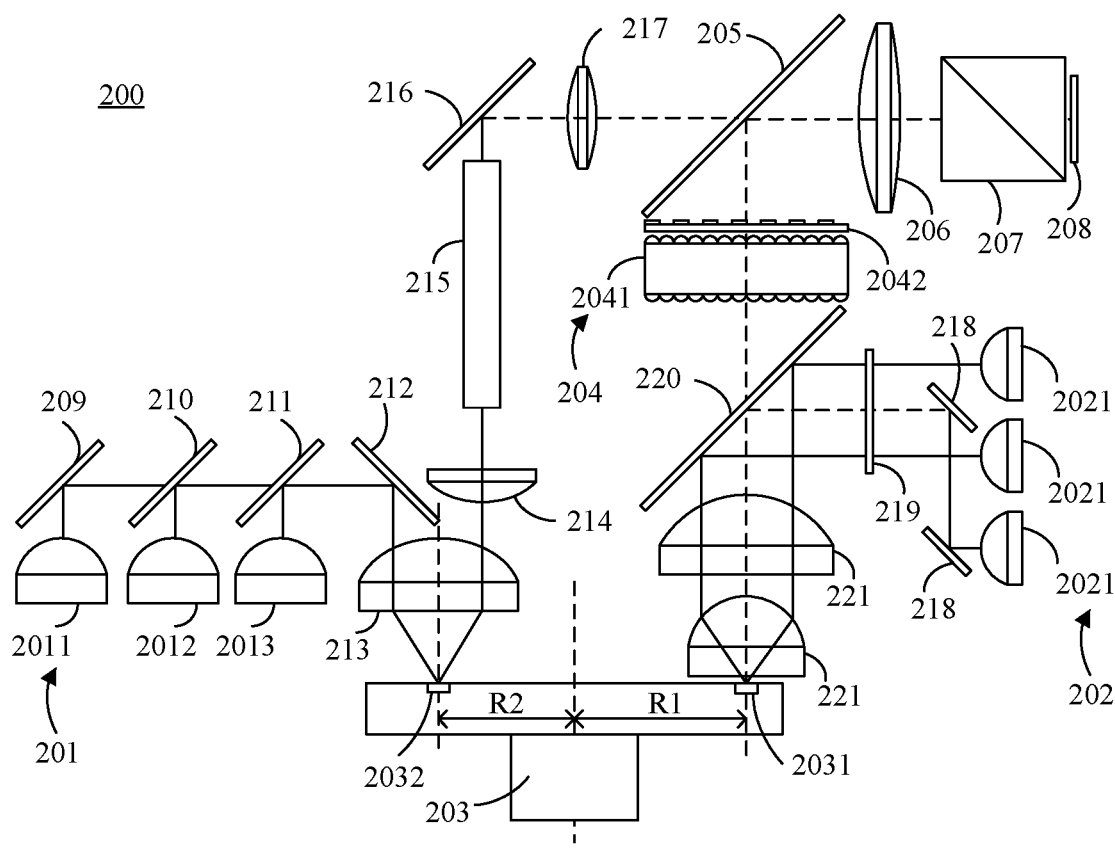
FIG. 2 is a schematic diagram of a light source system according to a second embodiment of the present disclosure.

FIG. 2 is a schematic diagram of a light source system according to a second embodiment of the present disclosure. Referring to FIG. 2, the light source system 200 includes a first light-emitting assembly 201, a second light-emitting assembly 202, a wavelength conversion device 203, an optical assembly 204, and a light combination device 205.

The first light-emitting assembly 201 includes at least a red laser source 2011 for generating a red laser, a green laser source 2012 for generating a green laser, and a blue laser source 2013 for generating a blue laser. The light source system 200 further includes three dichroic sheets 209, 210, and 211. The dichroic sheets 209, 210, and 211 each reflect lights in a certain wavelength range and transmit lights in another wavelength range. The dichroic sheet 209 reflects red laser and transmits lights having other colors. The dichroic sheet 210 reflects the green laser and transmits lights having other colors. The dichroic sheet 211 reflects the blue laser and transmits lights having other colors. Finally, the red laser, green laser and blue laser emitted from the first light-emitting assembly 201 respectively pass through the dichroic sheets 209, 210 and 211 to be combined. The primary light after light combination is incident to a scattering device. In an embodiment, the scattering device is a scattering region 2032 provided on the wavelength conversion device 203. Specifically, a scattering sheet is provided on the wavelength conversion device 203 to form the scattering region 2032.

It can be understood that, since the dichroic film 209 in this embodiment is required to reflect the red laser, the dichroic film 209 can also be replaced with a reflective component such as a mirror. The scattering device can be a scattering device that is separated and distinguishes from the wavelength conversion device 203, e.g., a scattering wheel.

The second light-emitting assembly 202 includes at least one excitation light source 2021. The excitation light emitted from the excitation light source 2021 is configured to excite the wavelength conversion material included in the wavelength conversion device 203 so as to generate an excited light. In an embodiment, taking the wavelength conversion material being a fluorescent material as an example, the generated excited light is a fluorescence corresponding to the color of the fluorescent material. The excitation light source 2021 can be a blue excitation light source. Correspondingly, the excitation light is a blue laser, but is not used as the blue primary light. The excitation light can be in a wavelength range from 445 nm to 465 nm. In order to obtain a better blue primary light, in an embodiment, the excitation wavelength of the excitation light source 2021 is 465 nm. In other embodiments, the excitation light source 2021 can also be a violet excitation light source or an ultraviolet excitation light source, etc., which is not limited in the present disclosure.

The wavelength conversion device 203 can be a color wheel. The technical solution of the present disclosure will be described below by taking the wavelength conversion device 203 being a color wheel as an example, but it is not limited thereto. In other embodiments, the wavelength conversion device 203 can also be other devices.

The color wheel 203 is provided with a wavelength conversion region 2031 and a scattering region 2032. The wavelength conversion region 2031 is at least partially provided on the optical path of the excitation light, receives the excitation light, and generates an excited light correspondingly. An incident direction of the excitation light with respect to the wavelength conversion region 2031 is opposite to or the same as an emission direction of the excited light with respect to the wavelength conversion region 2031, in which FIG. 2 only shows the former situation. The wavelength conversion region 2031 and the scattering region 2032 are provided at different radii of the color wheel 203, respectively. The wavelength conversion region 2031 and the scattering region 2032 are both circular structures centered on the axis of the color wheel 203. The scattering wavelength conversion region 2031 and the scattering region 2032 are provided with a fluorescent material and a scattering sheet, respectively. The fluorescent material is a fluorescent material or a quantum dot. The scattering sheet can weaken coherence of the laser beam, thereby eliminating speckles.

Figure 3:
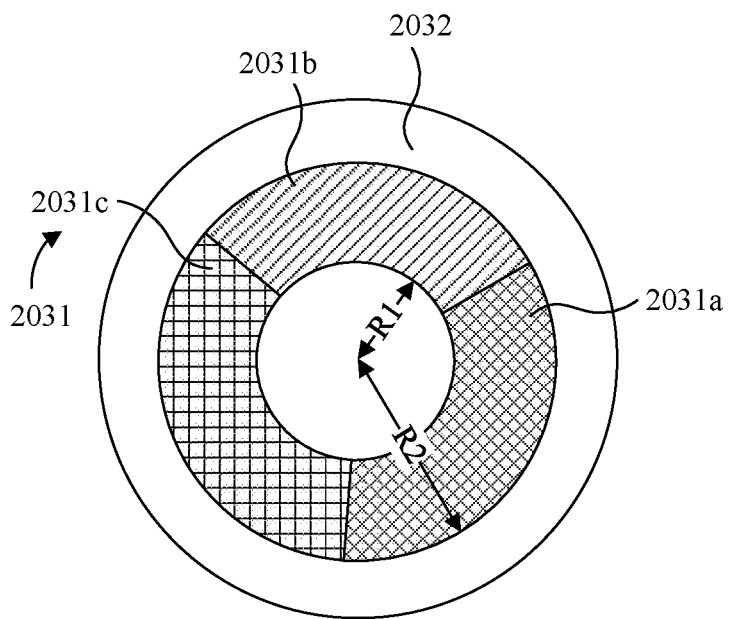
FIG. 3 is a schematic diagram of a wavelength conversion device according to an embodiment of the present disclosure.

For example, as shown in FIG. 3, a wavelength conversion region 2031 is provided at a radius R1. The wavelength conversion region 2031 can include a yellow fluorescent region 2031a, a green fluorescent region 2031b, and a red fluorescent region 2031c that are provided along a circumferential direction of the color wheel 203. A scattering region 2032 is provided at a radius R2, and is provided with a scattering sheet. In an embodiment, a width of the wavelength conversion region 2031 is set to be b, and a difference between the radius R2 and the radius R1 can be greater than or equal to b, that is, the wavelength conversion region 2031 and the scattering region 2032 can be provided continuously, or a gap can be provided between the wavelength conversion region 2031 and the scattering region 2032. In other embodiments, the scattering region 2032 can be provided at the radius R1, and the wavelength conversion region 2031 can be provided at the radius R2. The color wheel 203 rotates periodically along its axis. The yellow fluorescent region 2031a, the green fluorescent region 2031b, and the red fluorescent region 2031c periodically pass through the light path of the excitation light, receive the excitation light, and sequentially emit fluorescence corresponding to the color of the fluorescent region.

In an embodiment, the wavelength conversion region 2031 and the scattering region 2032 are provided at a same side of the color wheel 203. The primary light emitted from the first light-emitting assembly 201 and the excitation light emitted from the second light-emitting assembly 202 are incident to the wavelength conversion region 2031 and the scattering region 2032 from a same side of the color wheel 203, respectively.

Referring to FIG. 2, the optical assembly 204 includes a light homogenization component 2041 and a polarizing conversion system (PCS) 2042 that are sequentially provided along the optical path of the excited light. The light homogenization component 2041 is configured to split the excited light generated and emitted by the wavelength conversion region 2031 into a plurality of excited light beams that is output to the polarizing conversion system 2042. For example, the excited light emitted from the wavelength conversion device 203 is a first excited light. The light homogenization component 2041 processes the first excited light, and outputs a plurality of second excited light beams that is further incident to the polarizing conversion system 2042. The polarizing conversion system 2042 converts the plurality of incident second excited light beams into a polarized light. Specifically, the plurality of second excited light beams incident to the polarizing conversion system 2042 is split into a P-polarized light with a first polarization direction and an S-polarized light with a second polarization direction. Etendue of the plurality of second excited light beams is improved after the polarization, so that the etendue of the excited light emitted from the polarizing conversion system 2042 is greater than the etendue of the excited light entering the light homogenization component 2041.

In an embodiment, the polarizing conversion system 2042 is configured to split the excited light emitted from the light homogenization component 2041 into a P-polarized light and an S-polarized light. The incident excited light is split into two polarized lights. The beam located in the middle region diverges to two sides. Since the sectional area of the beam along its propagation direction is enlarged and a propagation angle is unchanged, its etendue is increased. In an embodiment, the etendue of the excited light can be at least doubled.

Figure 4:
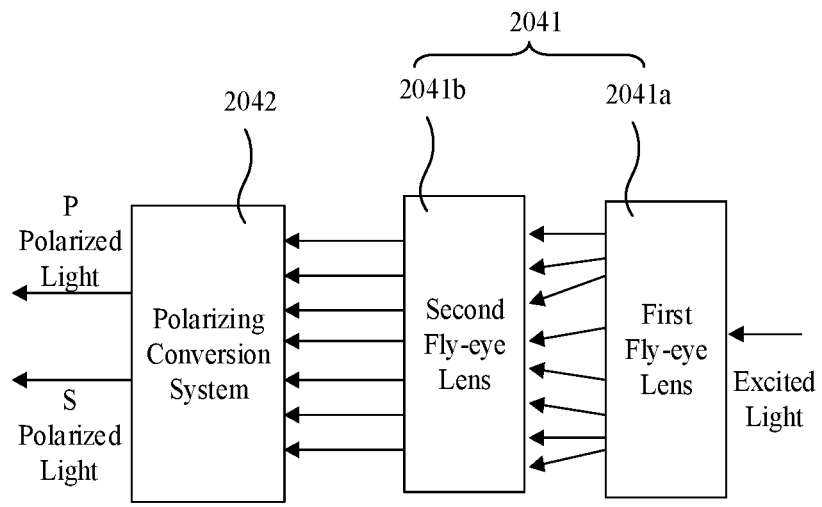
FIG. 4 is a schematic diagram of a fly-eye lens in the second embodiment shown in FIG. 2.

In an embodiment, the light homogenization component 2041 can be a fly-eye lens. As shown in FIG. 4, the fly-eye lens 2041 includes a first fly-eye lens 2041a and a second fly-eye lens 2041b that are opposed to each other. The first fly-eye lens 2041a and the second fly-eye lens 2041b each have a corresponding micro-lens array (not shown in the drawing). After the excited light is incident to the first fly-eye lens 2041a, it is split into a plurality of light beams by the micro-lens array of the first fly-eye lens 2041a. Since the micro-lens array on the first fly-eye lens 2041a corresponds to the micro-lens array on the second fly-eye lens 2041b, each light beam emitted from the first fly-eye lens 2041a can be imaged on the corresponding micro-lens in the micro-lens array of the second fly-eye lens 2041b, and the second fly-eye lens 2041b emits light beams equally spaced and having almost equal brightness to the polarizing conversion system 2042.

Figure 5:
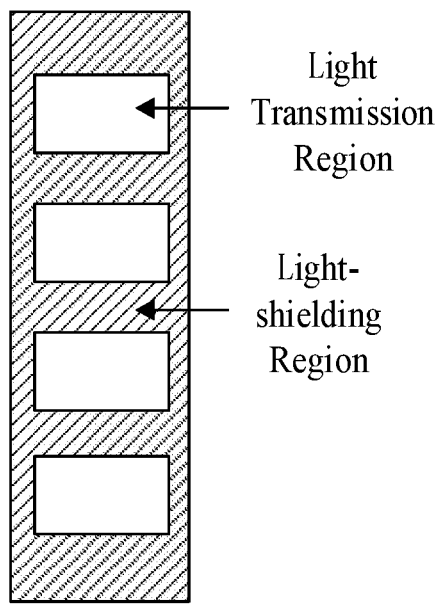
FIG. 5 is a schematic diagram of a light-shielding plate in the second embodiment shown in FIG. 2.

In another embodiment, the light homogenization component 2041 can also be a light-shielding plate. As shown in FIG. 5, light-shielding regions and light transmission regions of the light-shielding plate are alternatively arranged on the light-shielding plate. The light-shielding plate is configured to split the incident excited light into a plurality of light beams. The plurality of light beams are incident to the polarizing conversion system 2042, the polarizing conversion system 2042 splits the plurality of light beams emitted from the light-shielding plate into a P-polarized light and an S-polarized light.

In another embodiment, the light homogenization component 2041 can include the above fly-eye lens and the above light-shielding plate mentioned. The light transmission region of the light-shielding plate corresponds to the light-emitting region of the fly-eye lens. Specifically, the light transmission region of the light-shielding plate corresponds to the micro-lens array of the second fly-eye lens, it is best that the plurality of light beams emitted from the second fly-eye lens can just transmit the light transmission region of the light-shielding plate, which can be achieved with a positional relationship therebetween. This embodiment can further prevent redundant interference lights from entering the polarizing conversion system 2042 when performing light splitting. Further, in order to avoid loss of the excited light when the excited light after being homogenized by the fly eye lens enters the light-shielding region of the light-shielding plate, and at the same time in order to ensure normal operation of the polarizing conversion system 2042, the distance between the first fly-eye lens and the second fly-eye lens and the arrangement of micro-lenses in the micro-lens array can be adjusted, so that the light beam output by the second fly-eye lens can be incident to the polarizing conversion system 2042 from the light transmission region on the light-shielding plate for polarization splitting.

In another embodiment, the optical assembly 204 can also only include the polarizing conversion system 2042. In an embodiment, the excited light emitted from the wavelength conversion device 203 passes through a collection lens 221 and the dichroic sheet 220 and then is incident to the polarizing conversion system 2042. The polarizing conversion system 2042 converts the excited light into a polarized light. Specifically, the excited light incident to the polarizing conversion system 2042 is split into a P-polarized light with a first polarization direction and an S-polarized light with a second polarization direction, and the etendue of the excited light is improved after a polarization process. Therefore, the etendue of the excited light emitted from the polarizing conversion system 2042 is greater than the etendue of the incident excited light.

In a specific embodiment, the light combination device 205 includes a central region and a surrounding region (not shown in the drawings) outside the central region. The central region of the light combination device 205 is plated with a transmission film to form a transmission region. The transmission film can be an anti-reflection (AR) transmission film. The surrounding region of the light combination device 205 is plated with a reflective film to form a reflective region, that is, the light combination device 205 can be a light combination device in which the central region is a transmission region and the surrounding region is a reflective region.

As shown in FIG. 2, the primary light emitted from the first light-emitting assembly 201 along its emission light path is transmitted in the central region of the light combination device 205 in a direction toward a relay lens 206. The excited light generated by the color wheel 203 based on the excitation light emitted from the second light-emitting assembly 202 the light along its emission light path is reflected in a direction from the surrounding region of the light combination device 205 to the relay lens 206. As a result, mixing the primary light with the excited light is achieved at the light combination device 205 to form a combined light.

Further referring to FIG. 2, the light source system 200 further includes a relay lens 206, a polarization beam splitting prism 207, a light modulator 208, a mirror 212, a convergent lens 213, a convergent lens 214, a square rod 215, a mirror 216, a relay lens 217, a reflective strip 218, a light homogenization device 219, a dichroic sheet 220, and at least one collection lens 221. The mirror 212, the convergent lens 213, the convergent lens 214, the square rod 215, the mirror 216, and the relay lens 217 are provided on the emission light path of the primary light. The reflective strip 218, the light homogenization device 219, the dichroic film 220, and at least one collection lens 221 are provided on the emission light paths of the excitation light and the excited light.

Regarding the optical path of the primary light emitted from the first optical assembly 201, the mirror 212 is configured to reflect the mixed primary light emitted from the dichroic sheet 211 to the convergent lens 213. The convergent lens 213 is configured to converge the incident primary light to the scattering region 2032 of the wavelength conversion device 203. The scattering region 2032 of the wavelength conversion device 203 is at least partially provided on the light path of at least one primary light. The at least one primary light incident to the scattering region 2032 is scattered and reflected by the scattering sheet of the scattering region 2032, then passes through the convergent lens again 213 so as to adjust its transmission direction, then passes through the convergent lens 213, then passes through the convergent lens 214, and is incident to the square rod 215. The square rod 215 is a light homogenization optical device so as to homogenize at least one primary light in the square rod 215. At least one primary light after light processing passes through the mirror 216 and the relay lens 217 and then is incident to the light combination device 205.

Regarding the light path of the excitation light emitted from the second optical assembly 202, the reflective strip 218 is configured to reflect the incident excitation light, the light homogenization device 219 is configured to perform a homogenization process on the incident excitation light and output the processed excitation light to the dichroic sheet 220. The light homogenization device 219 can be a scattering sheet or a fly-eye lens, etc. The dichroic sheet 220 has optical characteristics of reflecting blue light and transmitting yellow light. The excitation light output by the light homogenization device 219 is reflected by the dichroic sheet 220 to the collection lens 221. The collection lens 221 converges the incident excitation light to the wavelength conversion region 2031 of the wavelength conversion device 203. The wavelength conversion region 2031 generates the excitation light based on excitation of the excitation light and emits the excited light to the collection lens 221. The emitted excited light passes through the collection lens 221, then transmit through the dichroic sheet 220, and then incident to the light homogenization component 2041. The light homogenization component 2041 homogenizes the excited light, and outputs the homogenized excited light to the polarization conversion device 2042. The polarization conversion device 2042 converts the polarization state of the incident excited light, and outputs the excited light to the light combination device 205.

Therefore, the primary light emitted from the first optical assembly 201 and the excited light generated by the color wheel 203 based on the excitation light of the second optical assembly 202 can be respectively guided to the light combination device 205 for light combination. Specifically, the primary light is converged by the mirror 216 and the relay lens 217, then is incident to the transmission region at the center of the light combination device 205 and transmits through the light combination device 205 to the relay lens 206. Further, the excited light processed by increasing the etendue is incident to the light combination device 205, and is reflected in the reflection region around the light combination device 205 and transmitted in the direction of the relay lens 206. Therefore, the light combination of the primary light and the excited light is realized by the light combination device 205.

In an embodiment, the number of collection lenses 221 can be adjusted as required. Further, the number of excitation light sources 2021 can be set according to specific requirements. Whether the reflective strip 218 is provided between the excitation light sources 2021 and the light homogenization device 219 and the number of the reflective strip 218 required to be provided are determined according to the number of excitation light sources 2021. For example, when the number of excitation light sources 2021 is less than 3, the excitation light source 2021 can directly inject the excitation light into the light homogenization device 219. When the number of excitation light sources 2021 is 3, as shown in FIG. 2, two reflective strip 218 can be provided. The excitation light emitted from the excitation light source 2021 can be guided to the light homogenization device 219 by the reflective strip 218.

It can be understood that a portion of the excited light can have a loss in the transmission region at the center of the light combination device 205. However, since the primary lights are all lasers which have a characteristic of extremely small divergence angle, the transmission region of the light combination device 205 can be set to be very small, so that the loss of the excited light in the transmission region at the center of the light combination device 205 is very small and can be ignored. It should be noted that, as illustrated in FIG. 2, increasing the etendue of the exited light refers to increasing the light coverage area of the exited light on the light combination device 205, therefore, percentage of the exited light passing through the light transmission region is lower since the area of the light transmission region is constant while the area of the exited light on the light combination device 205 is increased.

The relay lens 206 is configured to converge a combined light output by the light combination device 205. The combined light passes through the polarization beam splitter (PBS) 207, and then is incident to the light modulator 208. The number of the relay lens 206 can be set according to specific requirements. The light modulator 208 is configured to modulate the incident combined light so as to form a projection light. The projection light passes through the projection lens and finally projects an image on a projection screen. In an embodiment, the light modulator 208 can be a liquid crystal on silicon (LCOS) chip, a liquid crystal display (LCD) chip, or other deflection-based light modulators, such as a digital micro-mirror device (DMD) chip, which are not limited specifically in the present disclosure.

Figure 6:
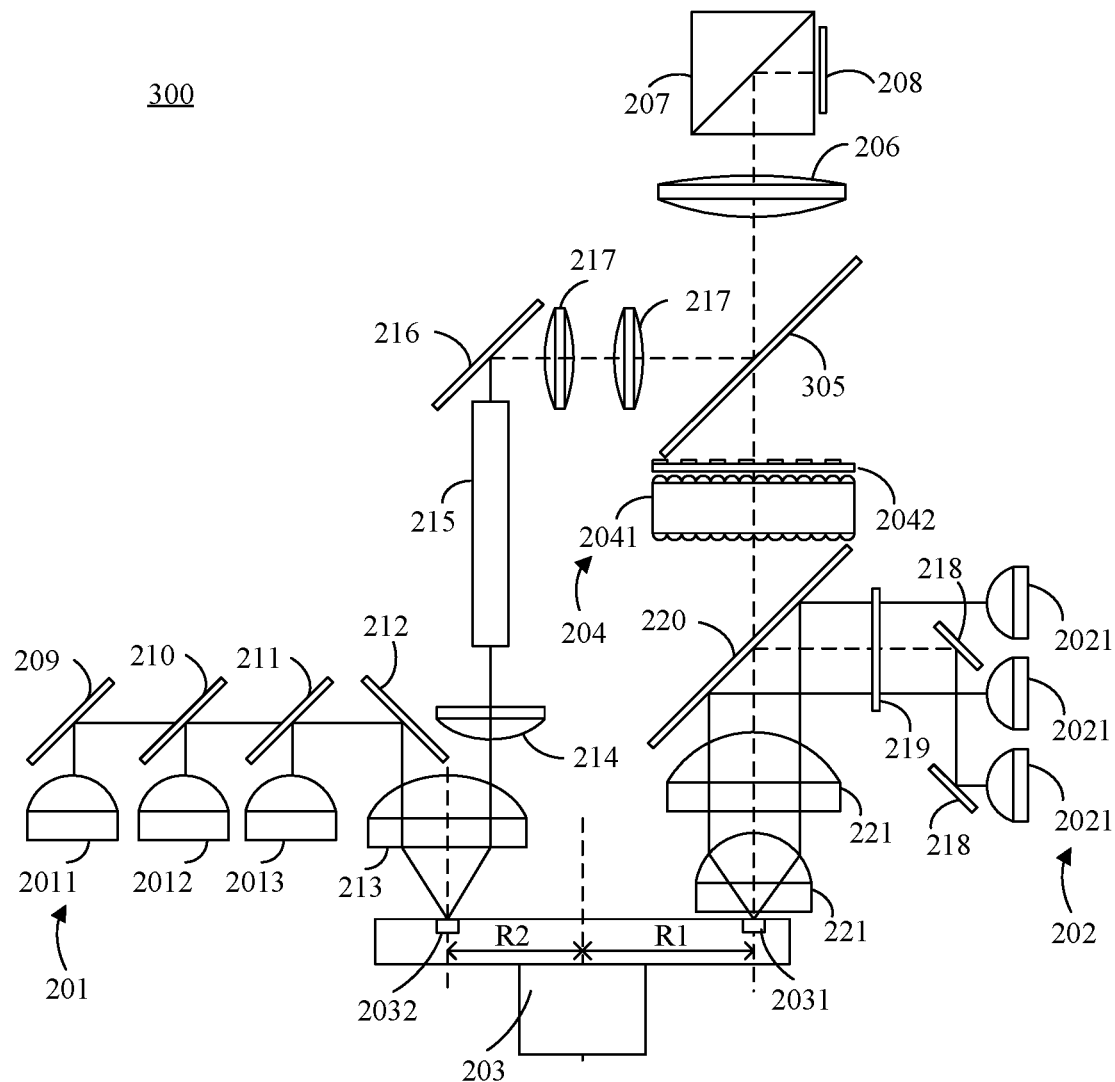
FIG. 6 is a schematic diagram of a light source system according to a third embodiment of the present disclosure.

In another embodiment, as shown in FIG. 6, FIG. 6 is a schematic diagram of a light source system according to a third embodiment of the present disclosure. The third embodiment is based on a variant of the light source system shown in FIG. 2. The difference between the third embodiment and the second embodiment of the light source system is that: the central region of the light combination device 305 in the light source system 300 is plated with a reflective film, and its surrounding region is plated with a transmission film. That is, the primary light emitted from the first light-emitting assembly 201 is reflected to the relay lens 206 by the reflection region at the center of the light combination device 305. The excited light generated by the wavelength conversion device 203 based on the excitation light emitted from the second light-emitting assembly 202 passes through the transmission region around the light combination device 305 and then is incident to the relay lens 206. In an embodiment, when the primary light passes through the light combination device 305, it is reflected by the reflective film plated on the central region to the relay lens 206. This type of light combination device 305 is easy to manufacture and can reduce production cost.

It can be understood that a portion of the excited light can have a loss in the reflection region at the center of the light combination device 305. However, since each primary light is laser which has a characteristic of extremely small divergence angle, the reflection region of the light combination device 305 can be set to be very small, so that the loss of the excited light in the reflection region at the center of the light combination device 305 is very small and can be ignored.

Figure 7:
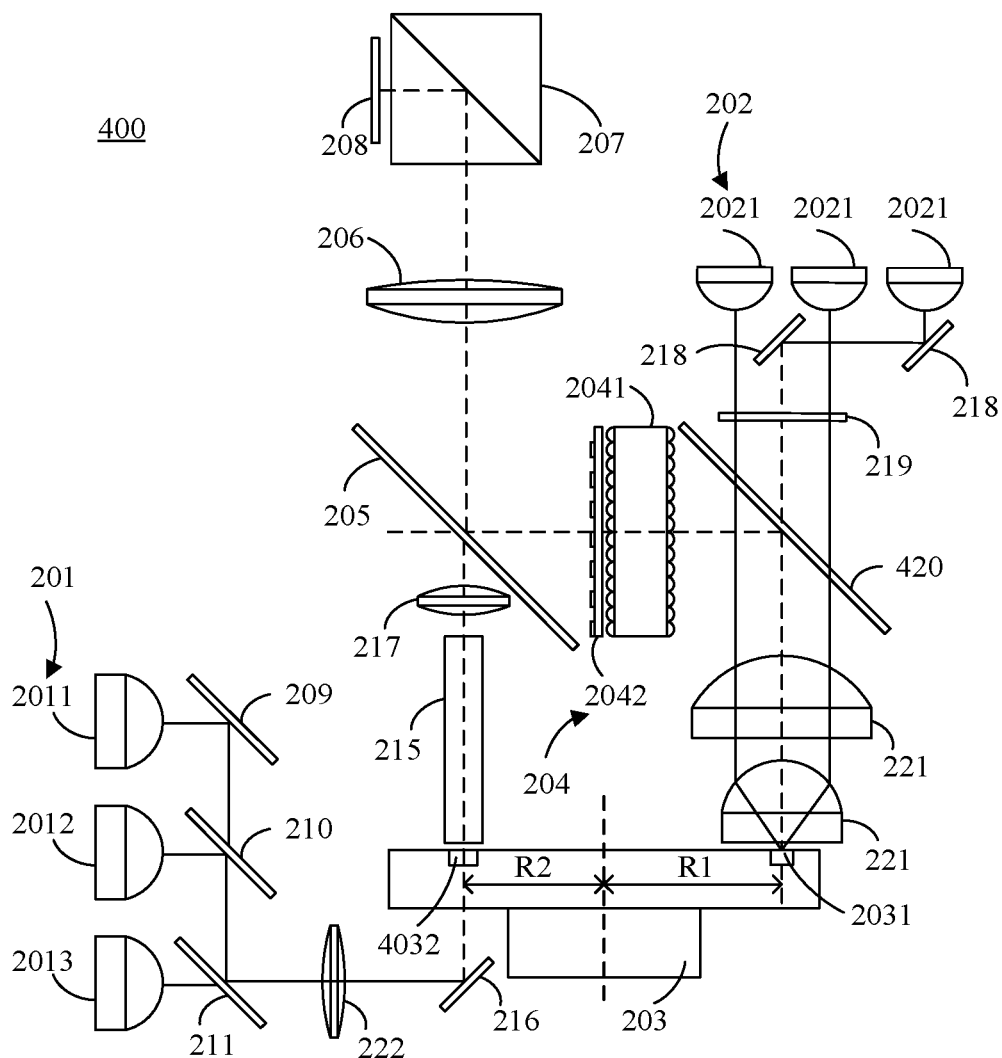
FIG. 7 is a schematic diagram of a light source system according to a fourth embodiment of the present disclosure.

In other specific embodiments, referring to FIG. 7, FIG. 7 is a schematic diagram of a light source system according to a fourth embodiment of the present disclosure. The fourth embodiment is based on a variant of the light source system shown in FIG. 2. The difference between the fourth embodiment and the second embodiment of the light source system is that: the primary light and the excitation light are injected from different sides of the color wheel 203, the primary light generated by the first light-emitting assembly 201 is transmitted at the scattering region 4032 of the color wheel 203, and the emission direction of the excited light generated by the wavelength conversion region 2031 is consistent with the incident direction of the excitation light.

The scattering region 4032 on the color wheel 203 is at least partially provided on the optical path of at least one primary light. The at least one primary light incident to the scattering region 4032 is transmitted through the scattering region 4032 and then incident to the light combination device 205 along the optical path of the primary light. Specifically, the color wheel 203 transmits the primary light to the square rod 215 and a focusing lens 217. The square rod 215 and the focusing lens 217 homogenize and converge the primary light, respectively. The converged primary light is transmitted through the transmission region at the center of the light combination device 205, and is finally imaged at the spatial modulator 208. The excitation light generated by the wavelength conversion device 203 based on the excitation light after being reflected by the dichroic sheet 420 passes through the light homogenization component 2041 and the polarization conversion device 2042, then is reflected by the reflection region around the light combination device 205, and finally is imaged at the spatial modulator 208. Therefore, the purpose of combining the primary light with the excited light at the light combination device 205 is achieved.

In an embodiment, in order to enable the primary light to better pass through the scattering region 4032, the bottom plate of the scattering region 4032 can be hollowed out or the substrate of the scattering region 4032 can be provided as a light transmission substrate.

In an embodiment, the scattering region 4032 and the wavelength conversion region 2031 can be provided at a same side of the color wheel 203, as shown in FIG. 7. In other embodiments, the scattering region 4032 can also be provided at an incidence surface of the primary light with respect to the color wheel 203.

In an embodiment, the primary light adopts a transmission manner at the scattering region 4032. After light combination, the lasers with different wavelengths pass through the convergent lens 222 and the mirror 216 and converge to the scattering region 4032, then transmits to the square rod 215 to perform light homogenization after weakening coherence by scattering, and then passes through the relay lens 217 to combine with the excited light. The blue laser beam for exciting the fluorescent material is transmitted at the dichroic sheet 420, and the excited light generated by excitation is reflected to the light homogenization component 2041 at the dichroic sheet 420. The light source system having this structure is more compact and saves space.

Figure 8:
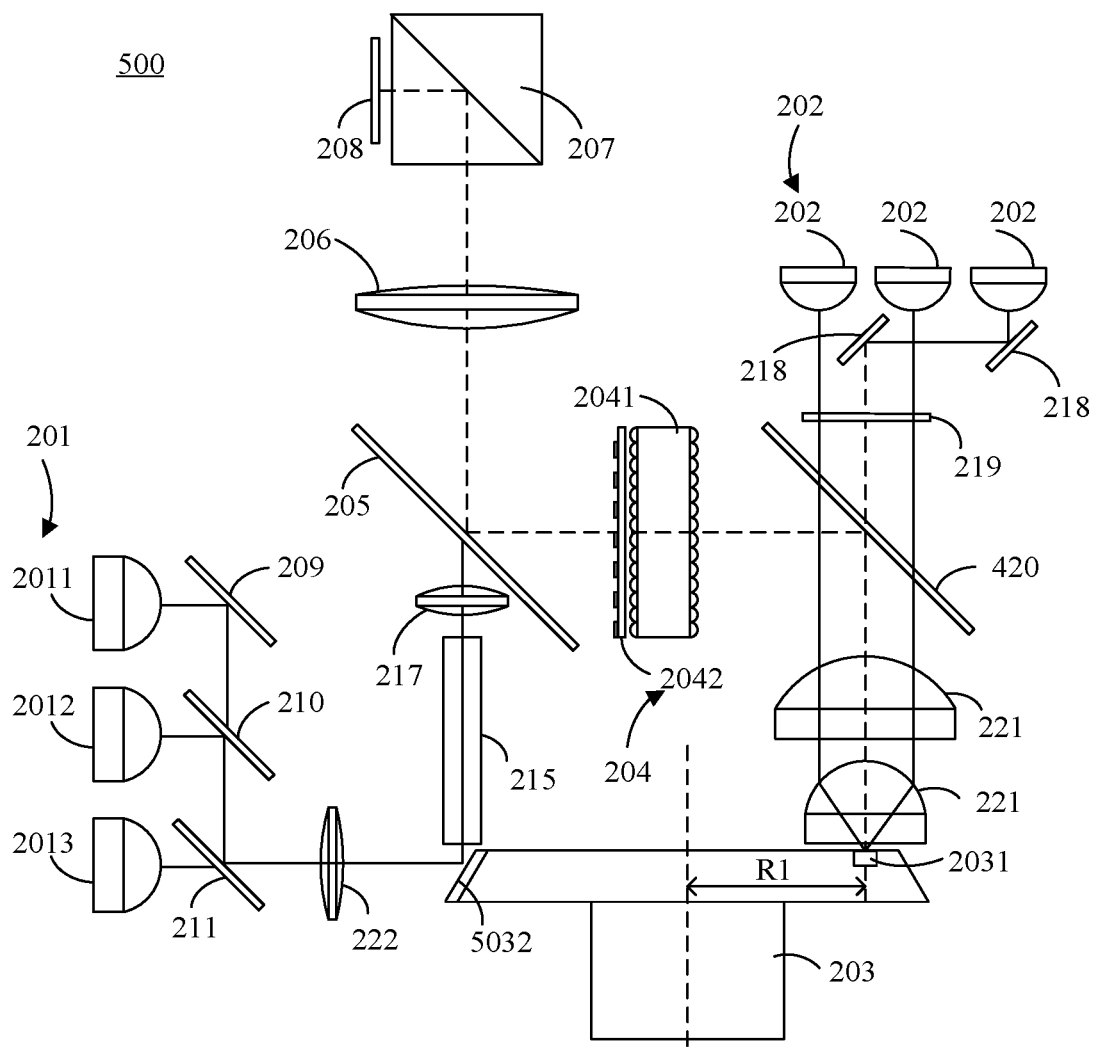
FIG. 8 is a schematic diagram of a light source system according to a fifth embodiment of the present disclosure.

Referring to FIG. 8, FIG. 8 is a schematic diagram of a light source system according to a fifth embodiment of the present disclosure. The fifth embodiment is based on a variant of the fourth embodiment of the light source system shown in FIG. 7. The difference between the fifth embodiment and the fourth embodiment of the light source system is that: in this embodiment, the wavelength conversion device 203 is provided with an inclination surface with a preset inclination angle, and the scattering region 5032 is provided on the inclination surface. The primary light generated by the first optical assembly 201 converges through the convergent lens 222 and then is incident to the scattering region 5032 of the inclination surface. At this time, the primary light has an incident angle corresponding to the inclination angle of the inclination surface with respect to the scattering region 5032, so that the primary light can be reflected by the scattering region 5032 to the square rod 215.

In an embodiment, the inclination surface is provided at the edge of the color wheel 203, that is, the edge of the color wheel 203 is provided as an inclination surface with a preset inclination angle. Further, the preset inclination angle can be 45°. The primary light is incident horizontally to the scattering region 5032 relative to the color wheel 203, at this time, the incident angle of the primary light relative to the scattering region 5032 is 45°. That is, the primary light can have a transmission direction deflected by 90° based on reflection of the scattering region 5032, and then is incident to the square rod 215.

In an embodiment, by setting the scattering region 5032 to be an inclination surface, the scattering region 5032 serves as a mirror while scattering the primary light, so that the number of optical elements in the light source system 500 can be reduced, thereby resulting in a more concise light path.

In the polarization-based light source system mentioned above, the excited light generated by excitation of the wavelength conversion device is natural light, and a polarizing conversion system is required to be provided in the rear optical path to convert natural light into the polarized light. During the conversion process, the etendue of the excited light can be increased manyfold. Since the laser emitted by the first optical assembly and the excited light generated by excitation of the wavelength conversion device are combined after performing polarization on the excited light, the etendue of the excited light is multiplied, so that a ratio of the etendue of the laser emitted from the first optical assembly to the etendue of the excited light generated by excitation of the wavelength conversion device can be increased, thereby reducing loss of the excited light during light combination, and improving optical efficiency of the light source system.

Figure 9:
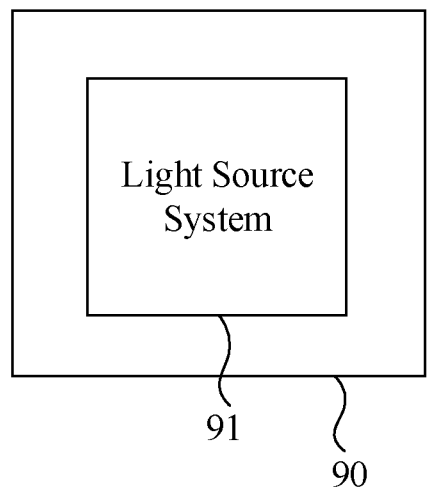
FIG. 9 is a schematic diagram of a display apparatus according to an embodiment of the present disclosure.

Referring to FIG. 9, FIG. 9 is a schematic diagram of a display apparatus according to an embodiment of the present disclosure. The display apparatus 90 includes a light source system 91. The light source system 91 is the light source system in the embodiments mentioned above.

The display apparatus 90 is a projection display optical-mechanical device including three-color laser and fluorescence. It adopts the characteristics of good laser color, high brightness, and small etendue of the laser, so that the laser is combined with fluorescence to form a projection display system, thereby achieving a high display brightness and a wide color gamut, and a compact structural system.

The above are only some embodiments of the present disclosure, and do not limit the scope of the present disclosure. Any equivalent structure or equivalent process transformation made using contents of the description and drawings of the present disclosure, or directly or indirectly applied to other related technical fields, are similarly included in the scope of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A light source system, comprising:
a first light-emitting assembly configured to generate at least one primary light;
a second light-emitting assembly configured to generate excitation light;
a wavelength conversion device at least partially provided on an optical path of the excitation light and configured to receive the excitation light and generate excited light;
an optical assembly provided on an optical path of the excited light and configured to increase etendue of the excited light before light combination of the at least one primary light and the excited light, to improve a ratio of etendue of the excited light to etendue of the at least one primary light and reduce loss of the excited light during the light combination; and
a light combination device provided on a common optical path of the at least one primary light and the excited light, located behind the optical assembly, and configured to combine the at least one primary light and the excited light.

2. The light source system according to claim 1, wherein the optical assembly comprises a polarizing conversion system configured to convert the excited light into a polarized light.

3. The light source system according to claim 2, wherein the optical assembly further comprises a light homogenization component, the light homogenization component being located between the polarizing conversion system and the wavelength conversion device, and being configured to split the excited light into a plurality of excited light beams and output the plurality of excited light beams to the polarizing conversion system.

4. The light source system according to claim 3, wherein the light homogenization component is a fly-eye lens, wherein the fly-eye lens comprises a first fly-eye lens and a second fly-eye lens that are opposite to each other, and each of the first fly-eye lens and the second fly-eye lens comprises a micro-lens array.

5. The light source system according to claim 2, wherein the optical assembly further comprises a light-shielding plate, wherein the light-shielding plate has light-shielding regions and light transmission regions that are alternately arranged, and is located between the polarizing conversion system and the wavelength conversion device and configured to split the excited light into a plurality of excited light beams.

6. The light source system according to claim 1, wherein the wavelength conversion device is a color wheel provided with a scattering region and a wavelength conversion region, wherein the scattering region and the wavelength conversion region are provided at different radii on the color wheel, respectively.

7. The light source system according to claim 6, wherein the scattering region is at least partially provided on an optical path of the at least one primary light, and the at least one primary light that is incident to the scattering region enters the light combination device after being reflected by the scattering region.

8. The light source system according to claim 6, wherein the wavelength conversion region is at least partially provided on the optical path of the excitation light, and is configured to receive the excitation light and generate the excited light correspondingly, and an incident direction of the excitation light with respect to the wavelength conversion region is opposite to an emission direction of the excited light with respect to the wavelength conversion region.

9. The light source system according to claim 6, wherein the color wheel is provided with an inclination surface having a preset inclination angle, and the scattering region is provided on the inclination surface.

10. The light source system according to claim 6, wherein the scattering region is at least partially provided on an optical path of the at least one primary light, and the at least one primary light that is incident to the scattering region enters the light combination device after transmitting the scattering region.

11. The light source system according to claim 6, wherein the wavelength conversion region is at least partially provided on the optical path of the excitation light, and is configured to receive the excitation light and generate the excited light correspondingly, and an incident direction of the excitation light with respect to the wavelength conversion region is the same as an emission direction of the excited light with respect to the wavelength conversion region.

12. The light source system according to claim 6, wherein a bottom plate of the scattering region is hollowed out, or a substrate of the scattering region is a light transmission substrate.

13. The light source system according to claim 1, wherein the light combination device has a central region and a surrounding region outside the central region, wherein the central region of the light combination device is plated with a transmission film to form a transmission region, wherein the transmission film is an anti-reflection (AR) transmission film, and the surrounding region of the light combination device is plated with a reflective film to form a reflective region.

14. The light source system according to claim 13, wherein the at least one primary light is scattered and reflected by a scattering sheet in a scattering region of the wavelength conversion device, then passes through a first convergent lens so as to adjust its transmission direction, then passes through a second convergent lens, and is incident to a square rod and then homogenized by a square rod, and then is incident to the transmission region located at a center of the light combination device after being condensed by a mirror and a relay lens.

15. The light source system according to claim 1, wherein the light combination device has a central region plated with a reflective film, and a surrounding region plated with a transmission film; and wherein the primary light emitted from the first light-emitting assembly is reflected to a relay lens by a reflection region at a center of the light combination device, the excited light generated by the wavelength conversion device based on the excitation light emitted from the second light-emitting assembly passes through a transmission region around the light combination device and then is incident to the relay lens.

16. A display apparatus, comprising the light source system according to claim 1.

17. A light source system, comprising:
a first light-emitting assembly configured to generate at least one primary light;
a second light-emitting assembly configured to generate excitation light;
a wavelength conversion device at least partially provided on an optical path of the excitation light and configured to receive the excitation light and generate excited light;
an optical assembly provided on an optical path of the excited light and configured to increase etendue of the excited light before light combination of the at least one primary light and the excited light, to improve a ratio of etendue of the excited light to etendue of the at least one primary light and reduce loss of the excited light during the light combination; and
a light combination device provided on a common optical path of the at least one primary light and the excited light, located behind the optical assembly, wherein the light combination device has a central region and a surrounding region outside the central region, and wherein the central region of the light combination device is configured to transmit the at least one primary light and the surrounding region of the light combination device is configured to reflect the excited light, or the central region of the light combination device is configured to reflect the at least one primary light and the surrounding region of the light combination device is configured to transmit the excited light, so as to combine the at least one primary light and the excited light.

18. The light source system according to claim 17, wherein the central region of the light combination device is plated with a transmission film to form a transmission region, and the surrounding region of the light combination device is plated with a reflective film to form a reflective region, wherein the transmission film is an anti-reflection (AR) transmission film; or the central region of the light combination device is plated with a reflective film to form a reflective region, and the surrounding region of the light combination device is plated with a transmission film to form a transmission region, wherein the transmission film is an anti-reflection (AR) transmission film.

19. The light source system according to claim 18, wherein the at least one primary light is scattered and reflected by a scattering sheet in a scattering region of the wavelength conversion device, then passes through a first convergent lens so as to adjust its transmission direction, then passes through a second convergent lens, and is incident to a square rod and then homogenized by a square rod, and then is incident to the transmission region of the light combination device after being condensed by a mirror and a relay lens.

20. A light source system, comprising:
a first light-emitting assembly configured to generate at least one primary light;
a second light-emitting assembly configured to generate excitation light;
a wavelength conversion device at least partially provided on an optical path of the excitation light and configured to receive the excitation light and generate excited light, wherein the wavelength conversion device has a scattering region and a wavelength conversion region;
an optical assembly provided on an optical path of the excited light and configured to increase etendue of the excited light before light combination of the at least one primary light and the excited light, to improve a ratio of etendue of the excited light to etendue of the at least one primary light and reduce loss of the excited light during the light combination; and
a light combination device provided on a common optical path of the at least one primary light and the excited light, located behind the optical assembly, wherein the light combination device has a central region and a surrounding region outside the central region,
wherein the central region of the light combination device is provided with a transmission region, and the surrounding region of the light combination device is provided with a reflective region, and wherein the at least one primary light is scattered and reflected by a scattering sheet in the scattering region of the wavelength conversion device, then passes through a first convergent lens so as to adjust its transmission direction, then passes through a second convergent lens, and is incident to a square rod and then homogenized by a square rod, and then is incident to the transmission region of the central region after being condensed by a mirror and a relay lens; or
the central region of the light combination device is provided with a reflective region, and the surrounding region of the light combination device is provided with a transmission region, and wherein the at least one primary light is scattered and reflected by a scattering sheet in the scattering region of the wavelength conversion device, then passes through a first convergent lens so as to adjust its transmission direction, then passes through a second convergent lens, and is incident to a square rod and then homogenized by a square rod, and then is incident to the reflective region of the central region after being condensed by a mirror and a relay lens.

\* \* \* \* \*